United States Patent
Lieberman et al.

(10) Patent No.: US 10,685,115 B1
(45) Date of Patent: Jun. 16, 2020

(54) METHOD AND SYSTEM FOR IMPLEMENTING CLOUD NATIVE APPLICATION THREAT DETECTION

(71) Applicant: EMC IP Holding Company LLC, Hopkinton, MA (US)

(72) Inventors: Amit Lieberman, Raanana (IL); Assaf Natanzon, Tel Aviv (IL); Oron Golan, Meitar (IL); Yuri Manusov, Beer Sheva (IL); Raul Shnier, Kibbutz Ruhama (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 323 days.

(21) Appl. No.: 15/795,852

(22) Filed: Oct. 27, 2017

(51) Int. Cl.
| | |
|---|---|
| G06F 21/56 | (2013.01) |
| G06F 21/55 | (2013.01) |
| G06F 21/57 | (2013.01) |
| H04L 29/06 | (2006.01) |

(52) U.S. Cl.
CPC .......... *G06F 21/566* (2013.01); *G06F 21/552* (2013.01); *H04L 63/1416* (2013.01); *G06F 21/554* (2013.01); *G06F 21/577* (2013.01)

(58) Field of Classification Search
CPC .... G06F 21/566; G06F 21/552; G06F 21/554; G06F 21/577; H04L 63/1416
USPC .......................................................... 726/22
See application file for complete search history.

(56) References Cited

U.S. PATENT DOCUMENTS

| | | | |
|---|---|---|---|
| 9,342,273 B1 * | 5/2016 | Kumar | G06F 8/20 |
| 2015/0319185 A1 * | 11/2015 | Kirti | H04L 63/1416 |
| | | | 726/23 |
| 2016/0164886 A1 * | 6/2016 | Thrash | H04L 63/14 |
| | | | 726/23 |
| 2016/0260157 A1 * | 9/2016 | Krook | G06Q 30/0635 |
| 2017/0104770 A1 * | 4/2017 | Jreij | H04L 63/20 |
| 2018/0027006 A1 * | 1/2018 | Zimmermann | H04L 63/0245 |
| | | | 726/11 |
| 2018/0136988 A1 * | 5/2018 | Nandagopal | G06F 9/542 |
| 2018/0324203 A1 * | 11/2018 | Estes | H04L 63/1433 |
| 2018/0359218 A1 * | 12/2018 | Church | H04L 63/0263 |

* cited by examiner

*Primary Examiner* — Alexander Lagor
*Assistant Examiner* — Moeen Khan
(74) *Attorney, Agent, or Firm* — Chamberlain, Hrdlicka, White, Williams & Aughtry

(57) ABSTRACT

A method and system for implementing cloud native application threat detection. Specifically, the disclosed method and system entail configuring a webhook within a build pipeline for cloud native applications, which when triggered by the detection of modifications to container configuration and/or definition files associated with the cloud native applications, forwards exact copies of the cloud native applications to a threat detection service for cyber security assessing. Further, based on the assessing, cloud native applications may be impeded from continuing, or alternatively, may be permitted to continue along, the build pipeline.

18 Claims, 10 Drawing Sheets

METHOD AND SYSTEM FOR IMPLEMENTING CLOUD NATIVE APPLICATION THREAT DETECTION

BACKGROUND

Cloud native applications are built on stacks of containers. Further, developers often use their own containers alongside third-party and open source containers, which rarely undergo cyber security assessments, to deploy their cloud native applications.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a method and system for implementing cloud native application threat detection. Specifically, one or more embodiments of the invention entail configuring a webhook within a build pipeline for cloud native applications, which when triggered by the detection of modifications to container configuration and/or definition files associated with the cloud native applications, forwards exact copies of the cloud native applications to a threat detection service for cyber security assessing. Further, based on the assessing, cloud native applications may be impeded from continuing, or alternatively, may be permitted to continue along, the build pipeline.

Figure 1:
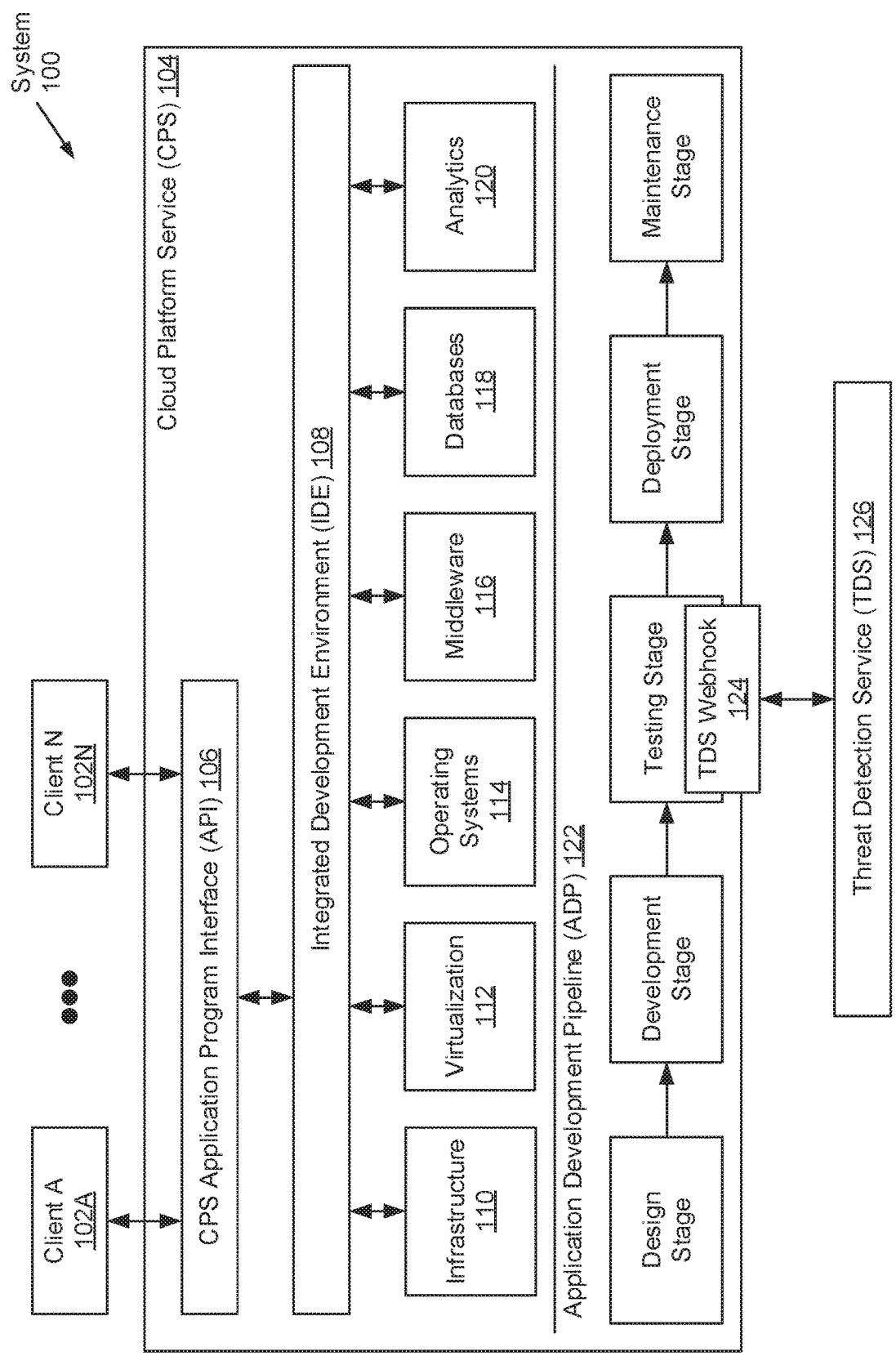
FIG. 1 shows a system in accordance with one or more embodiments of the invention.

FIG. 1 shows a system in accordance with one or more embodiments of the invention. The system (100) includes one or more clients (102A-102N) operatively connected to a cloud platform service (CPS) (104), which in turn is operatively connected to a threat detection service (TDS) (126). Each of these components is described below.

In one embodiment of the invention, the aforementioned components may be directly or indirectly connected to one another through a network (e.g., a local area network (LAN), a wide area network (WAN) such as the Internet, a mobile network, or any other network). The network (not shown) may be implemented using any combination of wired and/or wireless connections. In embodiments in which the aforementioned components are indirectly connected, there may be other networking components or systems (e.g., switches, routers, gateways, etc.) that may facilitate communication and/or information exchange. Further, the aforementioned components may interact with one another using any combination of one or more wired and/or wireless communication protocols.

In one embodiment of the invention, a client (102A-102N) may be any computing system (see e.g., FIG. 6) operated by a cloud native application (CNA) developer. A CNA may be a software application or computer program that may be created and executes within a cloud computing environment. That is, a CNA may be a software application or computer program that may be developed for use within (and thus is native to) a cloud computing environment. In one embodiment of the invention, a CNA may be developed as a collaboration of microservices. Each microservice may implement a separate functionality or feature of the CNA. Further, each microservice may execute its own computer process (i.e., instance of a computer program) and may communicate with other microservices using a lightweight interface (e.g., messaging, hypertext transfer protocol (HTTP) resource application program interfaces (APIs), etc.).

In one embodiment of the invention, each microservice may be implemented using one or more virtual machines (VMs) and/or containers, which may be deployed by a client (102A-102N) user/operator (e.g., an application developer/programmer, a system/datacenter administrator, etc.), a third party entity/user, or a combination thereof. A VM may be a distinct operating environment configured to inherit underlying functionality of the host operating system (OS) (and access to the underlying host hardware) using an abstraction layer. Further, a VM may include a separate instance of an OS, which may be distinct from the host OS. On the other hand, a container may be an isolated, lightweight virtualization mechanism that allows for the executing of an application or an OS within the container without the overhead of executing a hypervisor (i.e., a physical or virtual controller that serves to facilitate intra-host communication between one or more VMs and the host computer system hardware) (as is needed for executing VMs on underlying hardware).

Substantively, minimal overhead may be generated by containers because: (i) containers share the same OS kernel with other containers and the underlying host computing system (e.g., a server); and (ii) containers, unlike VMs, do not need to emulate physical hardware.

In one embodiment of the invention, with respect to interfacing with the CPS (104), a client (102A-102N) may include functionality to: (i) generate and transmit resource requests to the CPS (104); and (ii) receive resource responses including the requested resources from the CPS (104). The resources may be associated with the services (described below) provided by the CPS (104). One of ordinary skill will appreciate that a client (102A-102N) may perform other functionalities without departing from the scope of the invention. By way of examples, a client (102A-102N) may include a desktop computer, a laptop computer, a tablet computer, a server, a mainframe, a smartphone, a gaming console, or any other computing system similar to the exemplary computing system depicted in FIG. 6.

In one embodiment of the invention, the CPS (104) may be a complete CNA development and deployment environment. The CPS (104) may be hosted on a physical server (e.g., in a datacenter) or on a virtual server that may be cloud-based. Further, the CPS (104) may be hosted on a single server, or alternatively, on multiple servers that may be physical, virtual, or a combination thereof. In one embodiment of the invention, the CPS (104) may be hosted on one or more computing systems similar to the exemplary computing system shown in FIG. 6. Furthermore, in one embodiment of the invention, the CPS (104) may be a third-party platform as a service (PaaS) such as, for example, Microsoft Azure offered by Microsoft Corporation of Redmond, Wash. or Google App Engine offered by Google Inc. of Mountain View, Calif.

In one embodiment of the invention, the CPS (104) may include a CPS application program interface (API) (106) and an integrated development environment (IDE) (108). Each of these components are described below.

In one embodiment of the invention, the CPS API (106) may be a hardware and/or software implemented construct that employs a set of subroutine definitions, protocols, and/or tools for specifying the exchange of information between the CPS (104) and a client (102A-102N), or between the CPS (104) and the TDS (126). For example, the CPS API (106) may establish that the exchange of information may entail a request for processing and a return of a response, if any, based on the outcome of the processing. In one embodiment of the invention, the CPS API (106) may be implemented using hardware, software, firmware, or any combination thereof. By way of an example, the CPS API (106) may be a web API accessed through a webpage and/or a web browser, and a WAN (e.g., Internet) connection.

In one embodiment of the invention, the IDE (108) may be a central user interface that affords a set of programming tools for supporting the CNA lifecycle (also disclosed herein as the application development pipeline (ADP) (122) (described below)). The set of programming tools (not shown) may include, but is not limited to including: (i) a source code editor, which may include functionality to allow CNA developers to write and edit source code; (ii) a compiler, which may include functionality to transform source code into computer readable (or machine) program code; (iii) a debugger, which may include functionality to test and/or debug computer readable program code; and (iv) an interpreter, which may include functionality to execute (or perform the instructions specified in) the source code. By way of an example, the IDE (108) may be a web or cloud IDE, which may be accessed through the CPS API (106).

In one embodiment of the invention, the CPS (104) may include functionality to provide and manage at least the following resources: infrastructure (110), virtualization (112), operating systems (OSs) (114), middleware (116), databases (118), and analytics (120). Further, each of these aforementioned resources may be offered as a separate service component, which may be scalable and provided on-demand based on the different requirements sought by various CNA developers.

In one embodiment of the invention, with respect to infrastructure (110), the CPS (104) may assume the expense and complexity of provisioning and/or configuring datacenters, including contending with the compatibility of networks, servers, and storage systems therein. Further, with respect to virtualization (112), the CPS (104) may deploy abstraction layers (i.e., VMs) over the underlying hardware (i.e., infrastructure (110)) to maximize the use of resources and enable the diversification of applications executing thereon. Through virtualization (112), the CPS (104) may further offer libraries or a marketplace for containers (described above), which may be stacked to develop CNAs. Moreover, with respect to OSs (114), the CPS (104) may assume the burden of purchasing/licensing, installing, and updating/maintaining the various OSs (114) that may be employed throughout the ADP (122)—a burden that traditional falls to the CNA developer.

In one embodiment of the invention, with respect to middleware (116), the CPS (104) may provide the software and/or firmware for facilitating the connectivity and exchange of information between the various CPS (104) resources (110, 112, 114, 116, 118, 120). Furthermore, with respect to databases (118), the CPS (104) may assume the complexity of manipulating, managing, or otherwise deploying one or more data repositories in a cloud computing environment. Lastly, with respect to analytics (120), the CPS (104) may offer the capabilities for CNA developers to analyze and mine their data, leading to the discovery of useful patterns or insights for supporting the performance and/or marketability of their CNAs. One of ordinary skill will appreciate that the CPS (104) may provide or manage additional or alternative resources without departing from the scope of the invention.

In one embodiment of the invention, and using, at least in part, the above-mentioned resources (110, 112, 114, 116, 118, 120), the CPS (104) may include functionality to support the ADP (122). Specifically, the ADP (122) may refer to the development lifecycle for CNAs, which may be represented through successive stages including, but not limited to: a design stage, a development stage, a testing stage, a deployment stage, and a maintenance stage.

Briefly, the design stage may entail the brainstorming of a CNA, including the derivation of functional and non-functional requirements, to address an idea, a need, a challenge, or a risk. The development stage may entail implementing the CNA through the assembling and compiling of computer readable program code, or computer instructions. Further, the testing stage may entail evaluating the CNA to determine whether the CNA meets the requirements that guided its design and development, responds correctly to all kinds of inputs, performs its functions within an acceptable time, is sufficiently usable, and can be installed and executes in its intended environments. The deployment stage may entail releasing verified versions of CNAs for installation onto application marketplaces and/or production environments. Lastly, the maintenance stage may entail providing continuing support for released CNAs through the periodic deployment of upgrades, patches, etc., to resolve experienced issues and/or improve the CNAs over time.

In one embodiment of the invention, the CPS (104) may further include functionality to facilitate the configuration of webhooks (see e.g., FIG. 3) at any stage along the ADP (122). A webhook may be an event-based mechanism through which information may be relayed in real-time from the CPS (104) to an external application/service such as, for example, the TDS (126). Further, the relaying of information to an external application/service takes place in response to the occurrence of a designated event (promptly referred to as a webhook trigger), which may be configured by parties associated with the external application/service. By way of an example, the relay of information may be implemented through the transmission of a hypertext transfer protocol (HTTP) POST request or one or more packets belonging to any other messaging mechanism.

In one embodiment of the invention, a webhook (e.g., the TDS webhook (124)) may further behave similarly to a plugin, thereby enabling bidirectional information exchange, whereby after receiving and processing relayed information, an external application/service (e.g., the TDS (126)) may be permitted to return other information (based on the processing) back to the CPS (104). The return of the other information may also be implemented, for example, through the transmission of HTTP POST requests or other messaging mechanisms. Subsequently, the CPS (104) may thereafter use this returned information to influence the performing, modifying, or omitting of future behavior or actions, such as the proceeding to or halting of one or more stages outlined by the ADP (122).

In one embodiment of the invention, the TDS webhook (124) may include functionality to: (i) pass a first set of information (e.g., a CNA image or application granularity image (AGI) (described below)) from the CPS (104) to the TDS (126) during the triggering of an event within the testing stage of the ADP (122); and (ii) pass a second set of information (e.g., a cyber threat report (described below)) from the TDS (126) back to the CPS (104) based on processing of the first set of information by the TDS (126). Subsequently, in such an embodiment, the CPS (104) may use the second set of information to, for example, allow or deny the CNA to progress to the deployment stage of the ADP (122). Configuration of the TDS webhook (124) in accordance with embodiments of the invention is described in further detail below with respect to FIG. 3.

In one embodiment of the invention, returning to the discussion regarding the system (100) components, the TDS (126) may be a hardware and/or software implemented service that provides security threat detection and/or analyses on CNAs. The TDS (126) may be implemented on one or more servers (not shown). Each server may be a physical server (e.g., in a datacenter) or a virtual server that may be cloud-based. Alternatively, in one embodiment of the invention, the TDS (126) may be implemented on one or more computing systems similar to the exemplary computing system shown in FIG. 6. Furthermore, the TDS (126) may be programmed to receive requests from the CPS (104) in the form of one or more webhook messages (described below), and based on the processing of the requests, return reports advocating, or alternatively, halting, the succession of a CNA through the ADP (122). The TDS (126) is described in further detail below with respect to FIG. 2.

While FIG. 1 shows a configuration of components, other system configurations may be used without departing from the scope of the invention.

Figure 2:
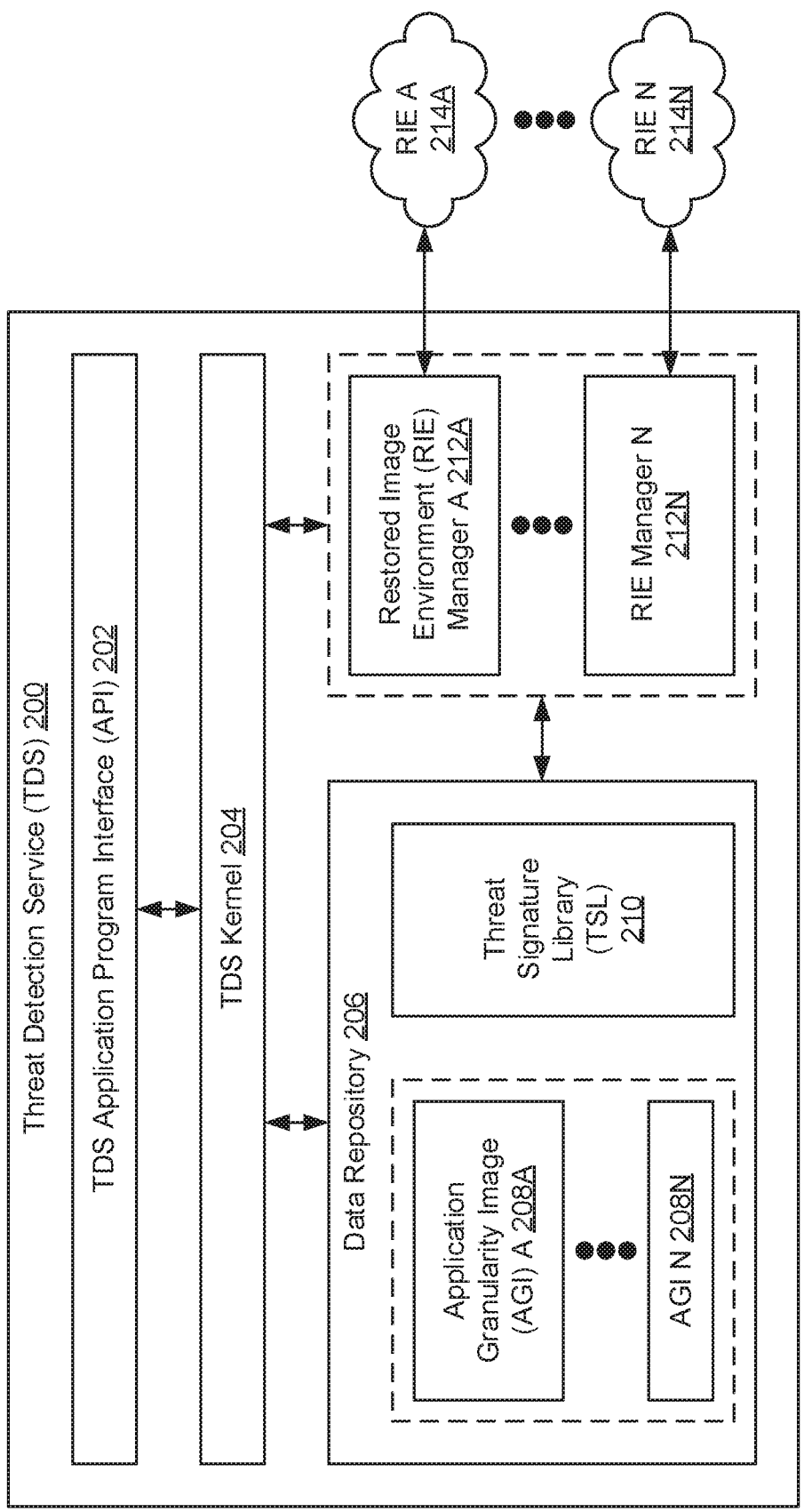
FIG. 2 shows a threat detection service in accordance with one or more embodiments of the invention.

FIG. 2 shows a threat detection service (TDS) in accordance with one or more embodiments of the invention. The TDS (200) includes a TDS API (202), a TDS kernel (204), a data repository (206), and one or more restored image environment (RIE) managers (212A-212N). Each of these components is described below.

In one embodiment of the invention, the TDS API (202) may be a hardware and/or software implemented construct that employs a set of subroutine definitions, protocols, and/or tools for specifying the exchange of information between the TDS (200) and the CPS (not shown). For example, the TDS API (202) may establish that the exchange of information entails a request for processing based on the meeting of a webhook trigger (described below) and a return of a response based on the outcome of the processing. Further, in one embodiment of the invention, the TDS API (202) may include logic necessary to interact with the TDS kernel (204). By way of an example, the TDS API (202) may be a web API accessed through a WAN (e.g., Internet) connection and protocols.

In one embodiment of the invention, the TDS API (202) may include functionality to: (i) receive application granularity images (AGIs) (208A-208N) (described below) from the CPS (not shown) in the form of one or more webhook messages; (ii) delegate the AGIs (208A-208N) to the TDS kernel (204) for storing and processing; (iii) receive cyber threat reports (CTRs) from the TDS kernel (204) based on the processing of the AGIs (208A-208N); (iv) encode the CTRs in a format, and based on a communication protocol, recognized by the CPS; and (v) transmit the encoded CTRs to the CPS. One of ordinary skill in the relevant art will appreciate that the TDS API (202) may perform other functionalities without departing from the scope of the invention.

In one embodiment of the invention, the TDS kernel (204) may be an application or computer program executing on the underlying hardware of the TDS (200). The TDS kernel (204) may include functionality to: (i) receive AGIs (208A-208N) from the TDS API (202); (ii) access the data repository (206) to store and/or retrieve AGIs (208A-208N); (iii) instantiate one or more RIEs (214A-214N); (iv) configure the RIEs (214A-214N) through the restoration of one or more AGIs (208A-208N) therein; (v) access the threat signature library (TSL) (210) within the data repository (206) to update the known threat signatures (described below) stored therein; (vi) create RIE managers (212A-212N) to monitor/probe instantiated RIEs (214A-214N); (vii) receive potential threat signature (PTS) and/or anomalous activity root (AAR) notifications from one or more RIE managers (212A-212N); and (viii) issue CTRs to the CPS based, at least in part, on the obtained PTS and/or AAR notifications. One of ordinary skill in the relevant art will appreciate that the TDS kernel (204) may perform other functionalities without departing from the scope of the invention.

In one embodiment of the invention, the data repository (206) may be a storage system or medium for consolidating various forms of data. The data repository (206) may be implemented using any type of storage unit and/or device (e.g., a file system, a database, a collection of tables, or any other storage mechanism). Further, the data repository (206) may be implemented using multiple storage units and/or devices, which may or may not be of the same type or located at the same physical site. In one embodiment of the invention, the data repository (206) may be implemented using persistent (i.e., non-volatile) storage media such as, for example, optical storage, magnetic storage, NAND Flash Memory, NOR Flash Memory, Magnetic Random Access Memory (M-RAM), Spin Torque Magnetic RAM (ST-RAM), Phase Change Memory (PCM), or any other memory defined as a non-volatile Storage Class Memory (SCM).

In one embodiment of the invention, the data repository (206) may be configured to store one or more AGIs (208A-208N). An AGI (208A-208N) may be an image-based snapshot of any granularity of an application (e.g., a CNA) at any given time of development. Specifically, with respect to granularity, and in one embodiment of the invention, an AGI (208A-208N) may represent as little as an exact copy of a VM or container directed at implementing a portion of a microservice. The aforementioned microservice portion may be responsible for enacting one or more (but not all) functionalities and features of the microservice, and thus, the CNA for which the microservice aids in implementing. In another embodiment of the invention, an AGI (208A-208N) may represent exact copies of multiple VMs and/or containers directed at implementing a complete microservice. The multiple VMs and/or containers, in this case, may implement all functionalities and features of the complete microservice, which in turn, however, may be responsible for enacting a subset of the functionalities and features of the CNA. Further, in yet another embodiment of the invention, an AGI (208A-208N) may represent exact copies of multiple microservices, where each microservice may be realized through a mutually exclusive set of VMs and/or containers. Accordingly, the multiple microservices may collaborate to enact all the functionalities and features of the corresponding CNA. Moreover, in one embodiment of the invention, an AGI (208A-208N) may be generated by the CPS in response to the meeting of a webhook trigger during testing of a CNA as part of the ADP (see e.g., FIG. 1).

In one embodiment of the invention, the data repository (206) may be further configured to store the TSL (210). The TSL (210) may be a repository for storing known cyber threat or attack signatures. A cyber threat signature (not shown) may be a piece of information (e.g., a recurring bit string, a data pattern, etc.) that uniquely identifies a particular cyber security threat or attack aimed at exploiting one or more weaknesses or vulnerabilities within one or more microservices or containers forming a CNA. Examples of cyber threats or attacks that cyber threat signatures stored in the TSL (210) may identify include, but are not limited to: malware, phishing attacks, password attacks, denial-of-service (DOS) attacks, man-in-the-middle (MITM) attacks, structured query language (SQL) injection attacks, cross-site scripting (XSS) attacks, session hijacking attacks, spear-phishing attacks, network probing attacks, brute-force cracking attacks, drive-by download attacks, advanced persistent threat (APT) attacks, and ransomware.

In one embodiment of the invention, a vulnerability (i.e., cyber security vulnerability) may be a flaw or weakness in CNA design, implementation, operation, internal controls, or management that could be exploited (either accidentally or intentionally). Further, exploitation of a vulnerability may result in a security breach of the CNA and/or microservice, which may lead to, for example, data loss, exposure of sensitive data, lack of accountability, denial of access, data corruption, application hijacking and/or impersonation, and other undesirable outcomes.

In one embodiment of the invention, a RIE manager (212A-212N) may be a computer process (or instance of a computer program) executing on the underlying hardware of the TDS (200). Specifically, a RIE manager (212A-212N) may be a computer process dedicated towards the management of one RIE (214A-214N). Subsequently, in one embodiment of the invention, a RIE manager (212A-212N) may include functionality to: (i) probe a respective RIE (214A-214N) by employing one or more scanning methodologies (e.g., port scanning, network vulnerability scanning, web application security scanning, database security scanning, host based vulnerability scanning, etc.) to identify PTSs; (ii) access the TSL (210) to perform pattern comparisons between PTSs and known cyber threat or attack signatures stored in the TSL (210); (iii) based on the pattern comparisons, determine whether a PTS matches a known cyber threat signature associated with a known cyber security threat or attack; (iv) based on the determining, issue PTS notifications to the TDS kernel (204); (v) probe a respective RIE (214A-214N) by monitoring the behavior of restored AGIs (208A-208N) therein to identify anomalous events or trends; (vi) assess any identified anomalous activity to identify the cause or AAR; and (vii) based on the assessing, issue AAR notifications to the TDS kernel (204).

In one embodiment of the invention, a RIE (214A-214N) may be an isolated (i.e., closed and protected) cloud computing environment for executing threat assessments (see e.g., FIGS. 4A-4F) on AGIs (208A-208N). Said another way, a RIE (214A-214N) may be a cloud based testing sandbox. Further, in one embodiment of the invention, a RIE (214A-214N) may be implemented on one or more servers (not shown). Each server may be a physical server or a virtual server that may be cloud-based. In one embodiment of the invention, a RIE (214A-214N) may be implemented on one or more computing systems similar to the exemplary computing system shown in FIG. 6. Furthermore, in one embodiment of the invention, a RIE (214A-214N) may be hosted on a subset of the servers and/or computing systems that form the TDS (200). In another embodiment of the invention, a RIE (214A-214N) may be hosted on a set of servers and/or computing systems that do not form the TDS (200). Moreover, isolation of a RIE (214A-214N) may be guaranteed through the implementation of a network configuration on a cloud computing network. The network configuration may, for example, limit access to the RIE (214A-214N) from external sources and other RIEs (214A-214N) (with the exception of the availability of one computer port per RIE (214A-214N) through which a RIE manager (212A-212N) may monitor/probe the RIE (214A-214N)). The network configuration may further, for example, obstruct access to external elements by the computing resources (e.g., VMs, containers, etc.) executing within the RIE (214A-214N).

Figure 3:
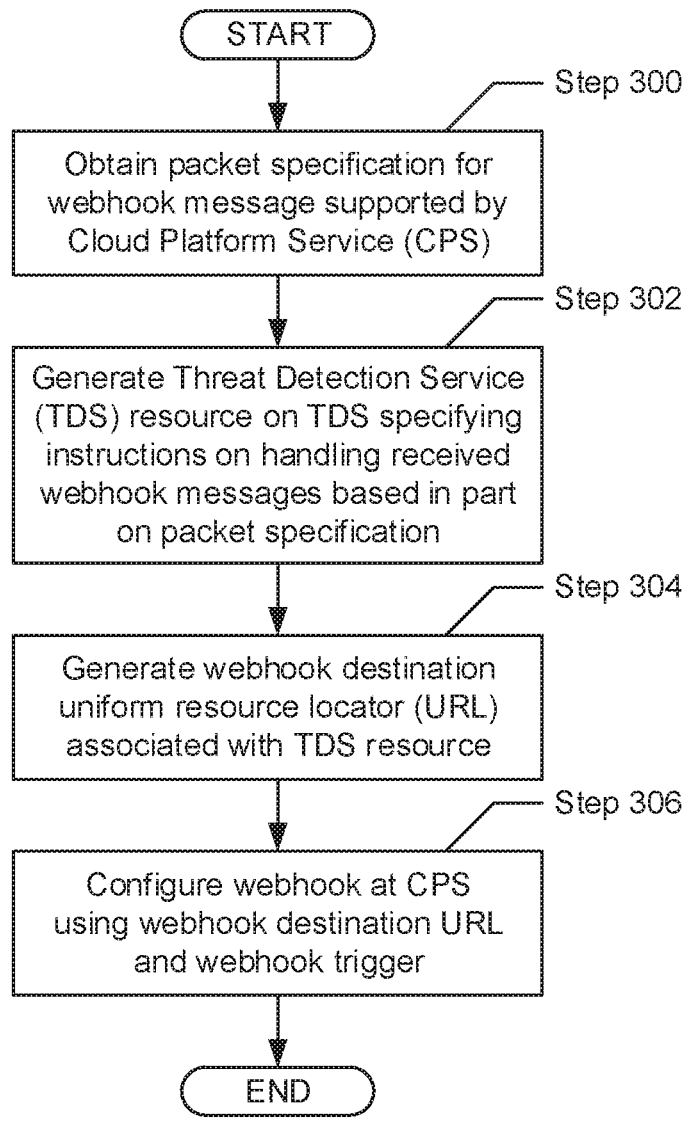
FIG. 3 shows a flowchart describing a method for configuring a webhook in accordance with one or more embodiments of the invention.

FIG. 3 shows a flowchart describing a method for configuring a webhook in accordance with one or more embodiments of the invention. While the various steps in the flowchart are presented and described sequentially, one of ordinary skill will appreciate that some or all steps may be executed in different orders, may be combined or omitted, and some or all steps may be executed in parallel. In one embodiment of the invention, the steps shown in FIG. 3 may be performed in parallel with any other steps shown in FIGS. 4A-4F without departing from the scope of the invention.

Turning to FIG. 3, in Step 300, a packet specification for a webhook message is obtained. In one embodiment of the invention, the packet specification may be documentation pertaining to the webhook message data format. For example, if the webhook message is a hypertext transfer protocol (HTTP) POST request, then the associated packet specification would indicate that the HTTP POST request includes at least: (i) a request-line specifying a request method token (i.e., POST—used to send data to a server), a request uniform resource locator (URL), and a protocol version; (ii) zero or more header fields (e.g., accept-charset, accept-encoding, authorization, from, host, if-range, range, etc.); (iii) an empty line indicating the end of the header fields, if any; and (iv) an optional message body, wherein the sent data or payload resides. Furthermore, the webhook message may be associated with a messaging mechanism belonging to one of the one or more messaging mechanisms that may be supported by a cloud platform service (CPS) (see e.g., FIG. 1).

In Step 302, a threat detection service (TDS) resource is generated on the TDS. In one embodiment of the invention, the TDS resource may be a script including computer readable program code expressed in any Internet supported computer readable program code language. In one embodiment of the invention, the TDS resource may be a web page (e.g., a file or document) accessible through any WAN such as the Internet. Further, the TDS resource may specify instructions pertaining to the handling of webhook messages that may be received by the TDS. In one embodiment of the invention, the aforementioned instructions may include parsing instructions detailing how to extract the message body (i.e., data or payload) and/or any other information from a received webhook message based on an understanding of the packet specification for the webhook message (obtained in Step 300). Additionally, the aforementioned instructions may further include processing instructions detailing how to process the message body and/or other information once the parsing is completed. Specifically, in one embodiment of the invention, the processing instructions, when executed by a computer processor, may perform one or more functionalities of the TDS that may involve the message body, or any other information, in accordance with embodiments of the invention (see e.g., FIGS. 4B-4F).

In Step 304, a webhook destination URL is generated. In one embodiment of the invention, the webhook destination URL may be a web address that references the TDS resource (generated earlier in Step 302) located on the TDS. Further, the webhook destination URL may conform to any existing or future developed WAN (e.g., Internet) communication protocol (e.g., Internet Protocol (IP)).

In Step 306, a webhook is subsequently configured at the CPS. As described above, in one embodiment of the invention, a webhook may be a mechanism through which information may be relayed in real-time from one application/service (i.e., the CPS) to another (i.e., the TDS), and/or vice versa, in response to the transpiring of a designated event (i.e., a webhook trigger). Configuration of a webhook may entail specifying at least: (i) the information that is to be relayed; (ii) the destination where the relayed information is to be received; and (iii) the event or criteria that must transpire for the relaying of the information, specified in (i), to the destination, specified in (ii), to take place.

In one embodiment of the invention, information that may be relayed from the CPS to the TDS may include one or more application granularity images (AGIs) (described below) for a CNA being developed through the CPS. One of ordinary skill will appreciate that additional or alternative information may be exchanged without departing from the scope of the invention. Further, in one embodiment of the invention, the destination to where the aforementioned information (i.e., one or more AGIs) may be directed may be referenced by the webhook destination URL (generated in Step 304).

In one embodiment of the invention, the webhook trigger (or event that must transpire) may include, but is not limited to, the detection of modifications to container configuration and/or definition files associated with a CNA being developed through the CPS. More specifically, the webhook trigger may include detecting modifications made to container related files that affect the container stack. A container stack may be the collection of containers (forming the one or more microservices) that implement the CNA. By way of an example, the webhook trigger may entail detecting one or more modifications to a Docker DockerFile associated with a CNA. A Docker DockerFile may be a document including build instructions for assembling an image-based snapshot of a multi-container implemented application (i.e., the CNA). By way of another example, the webhook trigger may entail detecting one or more modifications to a Kubernetes pod configuration file (and/or one or more deployment descriptor files) associated with a CNA. A Kubernetes pod configuration file may be a document, typically expressed in Yet Another Markup Language (YAML), which includes parameters for configuring a container pod—i.e., a grouping of one or more containers that may be co-located and co-scheduled, share common storage and/or networking resources, and execute in a shared context. A Kubernetes deployment descriptor file may be a document, also typically expressed in YAML, which includes parameters for outlining a microservice configuration (i.e., a deployment configuration describing one or more containers, and their collaboration with one another, that implement the microservice). By way of yet another example, the webhook trigger may entail detecting one or more modifications to the build pack attribute within a CloudFoundry manifest file associated with a CNA. A CloudFoundry manifest file may be a document, also typically expressed in YAML, which includes build instructions for deploying an application (i.e., the CNA). Further, the build pack attribute within the CloudFoundry manifest file includes instructions for configuring one or more containers that implement or execute the application.

FIGS. 4A-4F show flowcharts describing a method for implementing threat detection during cloud native application development in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel. In one embodiment of the invention, the steps shown in FIGS. 4A-4F may be performed in parallel with any other steps shown in FIG. 3 without departing from the scope of the invention.

Figure 4A:
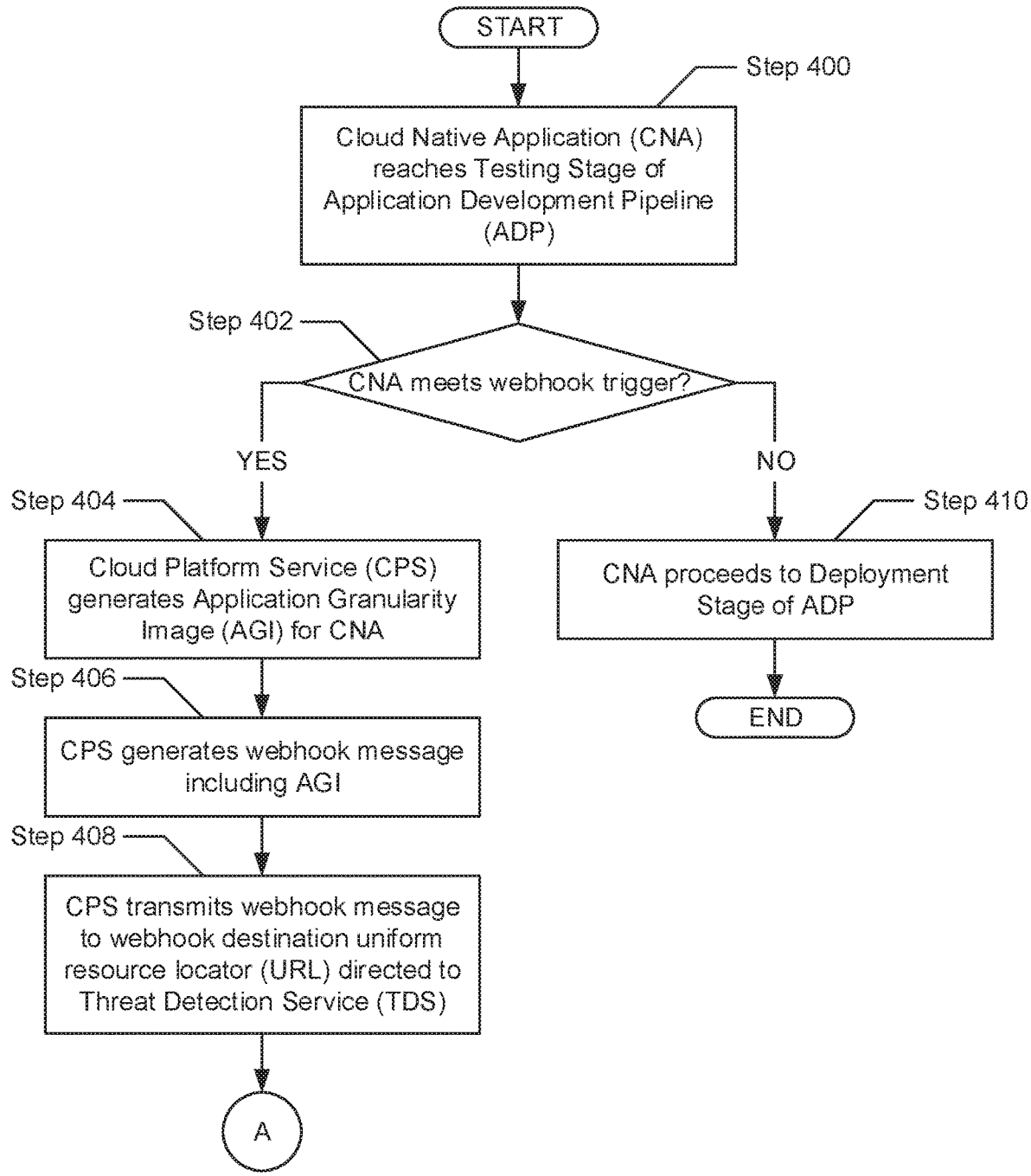
FIGS. 4A-4F show flowcharts describing a method for implementing threat detection during cloud native application development in accordance with one or more embodiments of the invention.

Turning to FIG. 4A, in Step 400, a cloud native application (CNA) reaches a testing stage of an application development pipeline (ADP) (see e.g., FIG. 1). Specifically, in one embodiment of the invention, a CNA may arrive at the testing stage of the ADP after fulfilling at least a design stage and a development stage. As described above, the testing stage may entail evaluating the CNA to determine whether the CNA, for example, meets the requirements that guided its design and development, responds correctly to all kinds of inputs, performs its functions within an acceptable time, is sufficiently usable, and can be installed and executes in its intended environments. The objective of the testing stage may be to discover, and subsequently resolve, any software bugs, errors, or other defects exhibited by the CNA, prior to deployment of the CNA.

In Step 402, while the CNA is being evaluated during the testing stage, a determination is made as to whether at least a portion of the CNA meets a webhook trigger (described above). In one embodiment of the invention, meeting the webhook trigger may entail detecting one or more modifications to container configuration and/or definition files (e.g., a Docker DockerFile, a Kubernetes pod configuration file, a CloudFoundry manifest file, etc.) associated with and/or disclosed within the CNA. Subsequently, if it is determined that at least a portion of the CNA meets the webhook trigger, then the process proceeds to Step 404. On the other hand, if it is alternatively determined that at least a portion of the CNA does not meet the webhook trigger, then the process proceeds to Step 410.

In Step 404, after determining (in Step 402) that at least a portion of the CNA meets the webhook trigger, one or more application granularity images (AGIs) for the CNA is/are generated. In one embodiment of the invention, generation of the AGI(s) may entail replicating, into one or more image-based snapshots, a single virtual machine (VM) or container that implements a portion of a microservice, where the microservice portion may be responsible for enacting one or more (but not all) functionalities and features of the microservice, and thus, one or more (but not all) functionalities and features of the CNA. In another embodiment of the invention, generation of the AGI(s) may entail replicating, into one or more image-based snapshots, multiple VMs and/or containers that implement a complete microservice, where the multiple VMs and/or containers may enact all functionalities and features of the complete microservice. Subsequently, in such an embodiment, the complete microservice may enact a subset of the functionalities and features of the CNA. Further, in yet another embodiment of the invention, generation of the AGI(s) may entail replicating, into one or more image-based snapshots, multiple microservices that may each be realized through a mutually exclusive set of VMs and/or containers. Accordingly, in such an embodiment, the multiple microservices may collaborate to enact all functionalities and features of the CNA.

In Step 406, one or more webhook messages is/are generated. In one embodiment of the invention, the webhook message(s) may collectively include the one or more AGI(s) (generated in Step 404). By way of an example, the webhook message(s) may entail one or more HTTP POST requests, where the respective one or more message bodies therein collectively encapsulate the AGI(s) for the CNA. In Step 408, the generated webhook message(s) is/are subsequently transmitted towards the threat detection service (TDS). In one embodiment of the invention, the webhook message(s) (generated in Step 406) may be relayed to the TDS, through a network, based on a webhook destination URL specified during the configuration of the webhook (see e.g., FIG. 3). The webhook destination URL may reference a resource residing on the TDS coded with instructions for handling (i.e., parsing and processing) the webhook message(s) once received.

In Step 410, after determining (in Step 402) that at least a portion of the CNA does not meet the webhook trigger (e.g., at least one modification to a container configuration and/or definition file associated with the CNA is not detected), the CNA proceeds towards the deployment stage of the ADP. Specifically, in one embodiment of the invention, following the aforementioned determination, and after the evaluation of the CNA (per the objective of the testing stage), the CNA may be granted permission to proceed towards the deployment stage of the ADP.

Figure 4B:
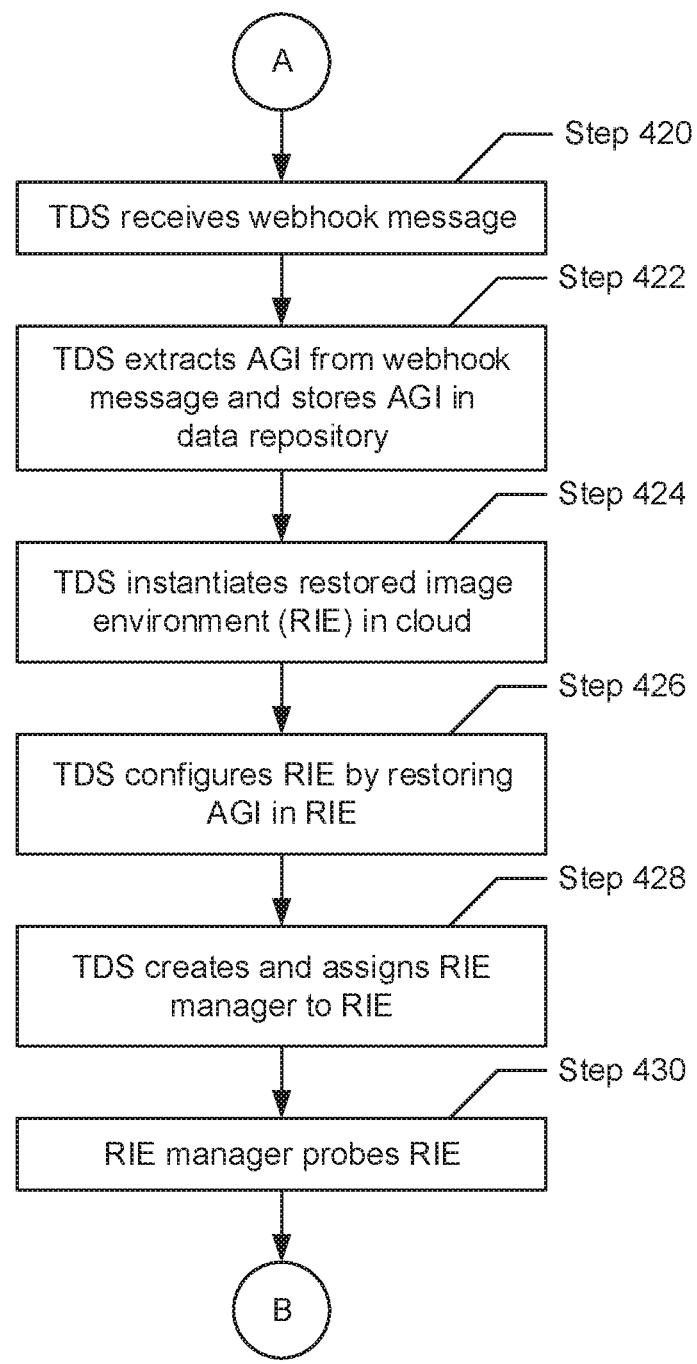

Turning to FIG. 4B, after the transmission of the webhook message(s) (in Step 408) from the CPS to the TDS, in Step 420, the TDS receives the webhook message(s). Specifically, in one embodiment of the invention, the webhook message(s) may be received at/by the TDS resource (see e.g., FIG. 3) referenced by the webhook destination URL specified during the configuration of the webhook at the CPS. As mentioned above, the TDS resource may include instructions (i.e., computer readable program code) for handling the webhook message(s) following their reception.

In Step 422, the one or more AGIs for the CNA (generated in Step 404 by the CPS) is/are extracted from the one or more webhook messages. In one embodiment of the invention, extraction of the AGI(s) from the webhook message(s) may entail executing parsing instructions, specified in the TDS resource, on the webhook message(s) (received in Step 420). The parsing instructions may be based on a packet specification for the data format in which the webhook message(s) is/are structured (obtained during the configuration of the webhook (see e.g., FIG. 3)). After the parsing is completed, additional instructions (i.e., processing instructions) specified in the TDS resource may then be executed, thereby enacting the processing of the extracted AGI(s). In one embodiment of the invention, processing of the extracted AGI(s) may begin with the storing of the AGI(s) in a data repository (see e.g., FIG. 2) residing on the TDS.

In Step 424, following the above-mentioned processing instructions specified in the TDS resource, a restored image environment (RIE) is instantiated. In one embodiment of the invention, instantiation of the RIE may entail allotment or dedication of cloud environment computing resources (e.g., computer processors, memory, persistent and/or non-persistent storage, network bandwidth, etc.) towards the creation and deployment of a cloud based testing sandbox. In one embodiment of the invention, the aforementioned cloud environment computing resources may derive from the servers and/or computing systems forming the TDS. In another embodiment of the invention, the cloud environment computing resources may derive from other servers and/or computing systems excluded from, yet may still be overseen by, the TDS.

In Step 426, the RIE (instantiated in Step 424) is configured. Specifically, in one embodiment of the invention, configuration of the RIE may entail restoring the one or more AGIs (extracted by the TDS in Step 422) therein. More specifically, to restore the AGI(s) within the RIE, the TDS, or particularly, the TDS kernel, may allocate additional cloud environment computing resources to instantiate one or more VMs and/or containers directed at emulating the behavior, functionalities, and/or interactivities of a portion of a microservice, a complete microservice, or multiple collaborative microservices.

In Step 428, a RIE manager, which may be responsible for the RIE, is created. In one embodiment of the invention, creation of the RIE manager may entail the instantiation of at least one computer process (or at least one instance of a computer program) executing on the TDS. After instantiation, the one or more computer processes may be configured with functionalities (described above), which befit those necessary for monitoring and probing the RIE, identifying potential threat signatures (PTSs) (described below), and identifying anomalous activity roots (AARs) (described below). One of ordinary skill will appreciate that the RIE manager may be configured to perform other functionalities without departing from the scope of the invention.

In Step 430, the RIE manager (created in Step 428) monitors/probes the RIE (instantiated and configured in Steps 424 and 426, respectively). In one embodiment of the invention, monitoring or probing of the RIE may entail employing one or more data scanning techniques or algorithms, which may include, but are not limited to, techniques/algorithms directed to port scanning, network vulnerability scanning, web application security scanning, database security scanning, and host based vulnerability scanning. Further, in one embodiment of the invention, the employed scanning techniques may be used to detect PTSs (e.g., unique recurring bit strings, data patterns, etc.) potentially representative of one or more known cyber security threats or attacks that may be exploiting one or more vulnerabilities within the AGI(s).

In another embodiment of the invention, the employed scanning techniques or algorithms may be used to detect anomalous events or trends that may be induced by the presence of one or more unknown cyber security threats or attacks that may be targeting the AGI(s). Further, detection of anomalous activities (i.e., events or trends) may entail tracking critical system and/or network characteristics exhibited by the AGI(s) while restored in the RIE. Examples of these critical characteristics include, but are not limited to including: network traffic volume, network bandwidth use, network protocol use, disk drive activity, CPU load, memory usage, changes in OS registries, and system call use.

Figure 4C:
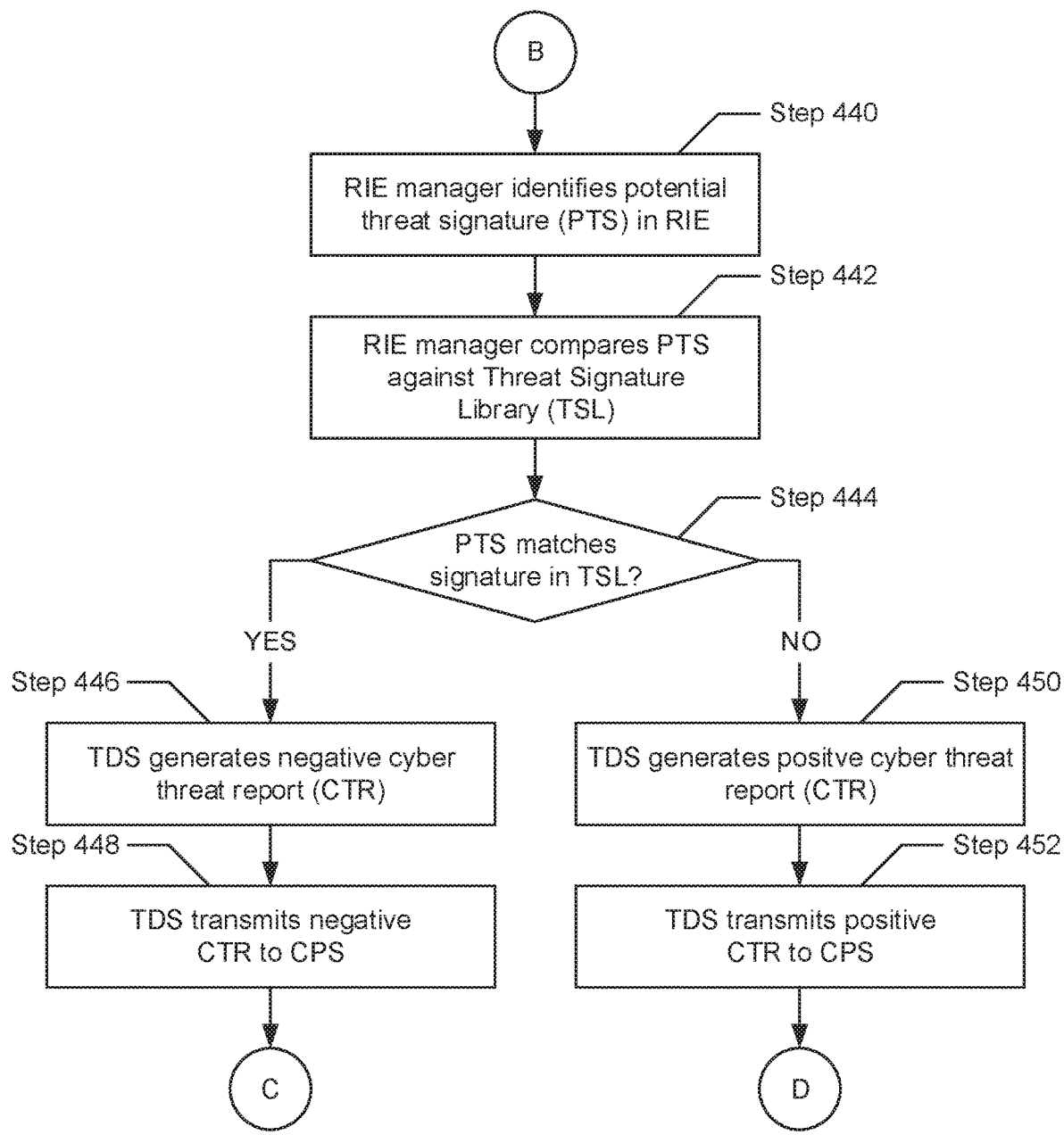

Turning to FIG. 4C, in Step 440, in one embodiment of the invention, following the monitoring/probing of the RIE (during Step 430), one or more PTSs is/are identified. A PTS may be information (e.g., a recurring bit string, a data pattern, etc.) discovered in the AGI(s) that may or may not identify (or associate) with a known cyber security threat/ attack. Following the identification of the PTS(s), in Step 442, each of the one or more PTSs is compared against the known cyber security threat/attack signatures stored in the threat signature library (TSL) (see e.g., FIG. 2) residing on the TDS.

In Step 444, for each PTS (identified in Step 440), a determination is made as to whether the PTS matches one of the one or more known cyber security threat/attack signatures stored in the TSL. Substantively, if it is determined, based on the comparison (performed in Step 442), that at least one PTS matches at least one known cyber security threat/attack signature, respectively, then the matching may affirm that the associated at least one known cyber security threat/attack is exploiting at least one vulnerability exhibited in the AGI(s). Subsequently, based on this determination, the process then proceeds to Step 446. On the other hand, if it is alternatively determined, based on the comparison (performed in Step 442), that none of the PTSs match at least one known cyber security threat/attack signature, then the mismatching may affirm that no known cyber security threats/ attacks are exploiting at least one vulnerability exhibited in the AGI(s). Subsequently, based on this alternative determination, the process then proceeds to Step 450.

In Step 446, after determining (in Step 444) that at least one PTS matches at least one known cyber security threat/ attack signature stored in the TSL, a negative cyber threat report (CTR) is generated. In one embodiment of the invention, the negative CTR may be a report detailing the negative outcome resulting from the probing of the AGI(s). Specifically, the negative CTR may include, but is not limited to including, the following information: (i) the identified at least one PTS, or alternatively, the corresponding at least one known cyber security threat/attack signature; (ii) a brief description describing the at least one known cyber security threat/attack to which the identified at least one PTS matches; (iii) the AGI(s) components (e.g., microservice(s), container(s), computer process(es), etc.) where the identified at least one PTS was/were discovered; and (iv) a recommendation to halt the proceeding of the CNA, with which the AGI(s) is/are associated, to the deployment stage of the ADP (see e.g., FIG. 1).

In Step 448, the negative CTR (generated in Step 446) is transmitted back to the CPS. In one embodiment of the invention, transmission of the negative CTR may represent a final task that follows the above-mentioned processing instructions specified in the TDS resource (for processing the AGI(s)). Further, transmission of the negative CTR may entail utilizing the webhook operatively connecting the CPS and the TDS. In one embodiment of the invention, in acting as a plugin, the webhook may not only facilitate the transmission of the webhook message (in Step 408) from the CPS to the TDS, but may also permit the return of information from the TDS back to the CPS in response or based on processing involving the webhook message and/or enclosed information (i.e., the AGI(s)) therein. From here, the process proceeds to Step 460A (see e.g., FIG. 4D).

In Step 450, after determining (in Step 444) that none of the PTSs match at least one known cyber security threat/ attack signature stored in the TSL, a positive cyber threat report (CTR) is generated. In one embodiment of the invention, the positive CTR may be a report detailing the positive outcome resulting from the probing of the AGI(s). Specifically, the positive CTR may include, but is not limited to including, a recommendation to permit the proceeding of the CNA, with which the AGI(s) is/are associated, to the deployment stage of the ADP (see e.g., FIG. 1).

In Step 452, the positive CTR (generated in Step 450) is transmitted back to the CPS. In one embodiment of the invention, transmission of the positive CTR may represent a final task that follows the above-mentioned processing instructions specified in the TDS resource (for processing the AGI(s)). Further, transmission of the positive CTR may entail utilizing the webhook operatively connecting the CPS and the TDS. In one embodiment of the invention, in acting as a plugin, the webhook may not only facilitate the transmission of the webhook message (in Step 408) from the CPS to the TDS, but may also permit the return of information from the TDS back to the CPS in response or based on processing involving the webhook message and/or enclosed information (i.e., the AGI(s)) therein. From here, the process proceeds to Step 460B (see e.g., FIG. 4E).

Figure 4D:
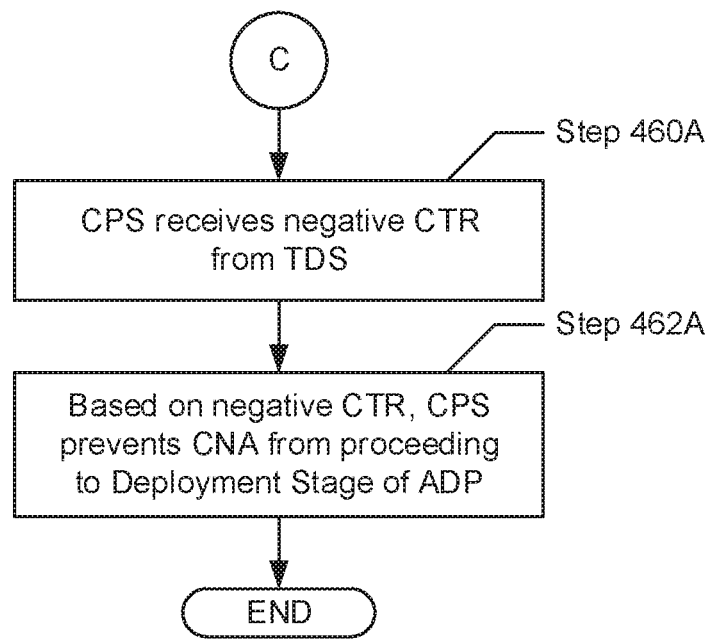

Turning to FIG. 4D, in Step 460A, the CPS receives the negative CTR from the TDS. In one embodiment of the invention, the negative CTR may have been transmitted to the CPS (in Step 448; see e.g., FIG. 4C) following the matching of at least one PTS to at least one known cyber security threat/attack signature stored in the TSL. In another embodiment of the invention, the negative CTR may have been transmitted to the CPS (in Step 488; see e.g., FIG. 4F) (described below) following the identification of anomalous activity root (AAR).

Thereafter, in Step 462A, based on at least a portion of the negative CTR (i.e., the enclosed recommendation), the CPS prevents the CNA (undergoing evaluation during the testing stage of the ADP) (see e.g., Step 400) from proceeding to the deployment stage of the ADP (see e.g., FIG. 1). In one embodiment of the invention, preventing the CNA from deploying (e.g., into an application marketplace or any computing system where the CNA may be installed) may serve as a countermeasure to limit, if not prevent, the global dissemination of the identified cyber security threat(s)/attack(s) or the identified anomalous activity root(s). Further, in one embodiment of the invention, the CPS may use the remaining information enclosed in the CTR (see e.g., Step 446 or Step 486) to: (i) provide rationale, to one or more CNA developers, for the halting of the progression of their CNA through the ADP; and/or (ii) to proactively scan for, and subsequently quarantine (or formulate other countermeasures for dealing with), instances of the identified cyber security threat(s)/attack(s) and/or anomalous activity root(s) throughout the CPS.

Figure 4E:
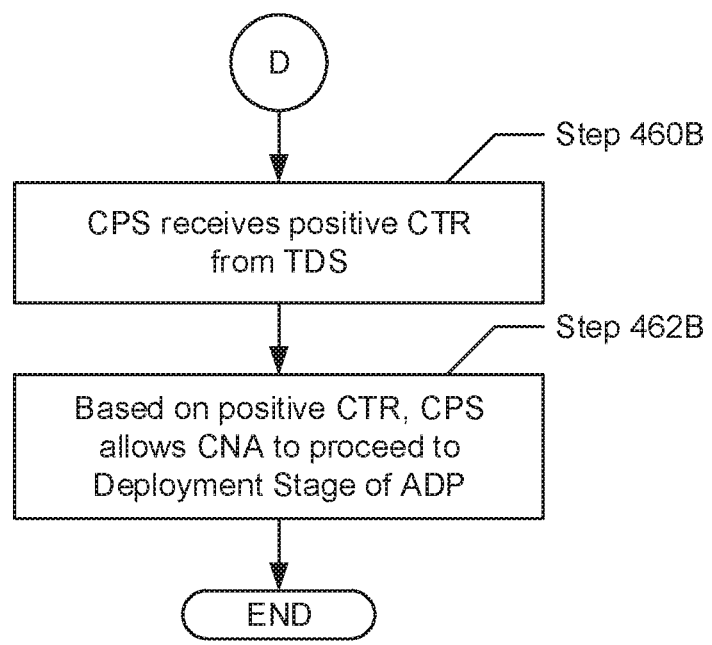

Turning to FIG. 4E, in Step 460B, the CPS receives the positive CTR from the TDS. In one embodiment of the invention, the positive CTR may have been transmitted to the CPS (in Step 452; see e.g., FIG. 4C) following a determination that none of the PTSs match at least one known cyber security threat/attack signature stored in the TSL. In another embodiment of the invention, the positive CTR may have been transmitted to the CPS (in Step 492; see e.g., FIG. 4F) (described below) following a determination that no anomalous activity root(s) (AARs) was/were identified.

Thereafter, in Step 462B, based on the recommendation enclosed in the positive CTR, the CPS allows the CNA (undergoing evaluation during the testing stage of the ADP) (see e.g., Step 400) to proceed to the deployment stage of the ADP (see e.g., FIG. 1). In one embodiment of the invention, permitting the CNA to proceed to the deployment stage may entail permitting the CNA to transition into an application marketplace, or to execute on any computing system whereon the CNA may be installed.

Figure 4F:
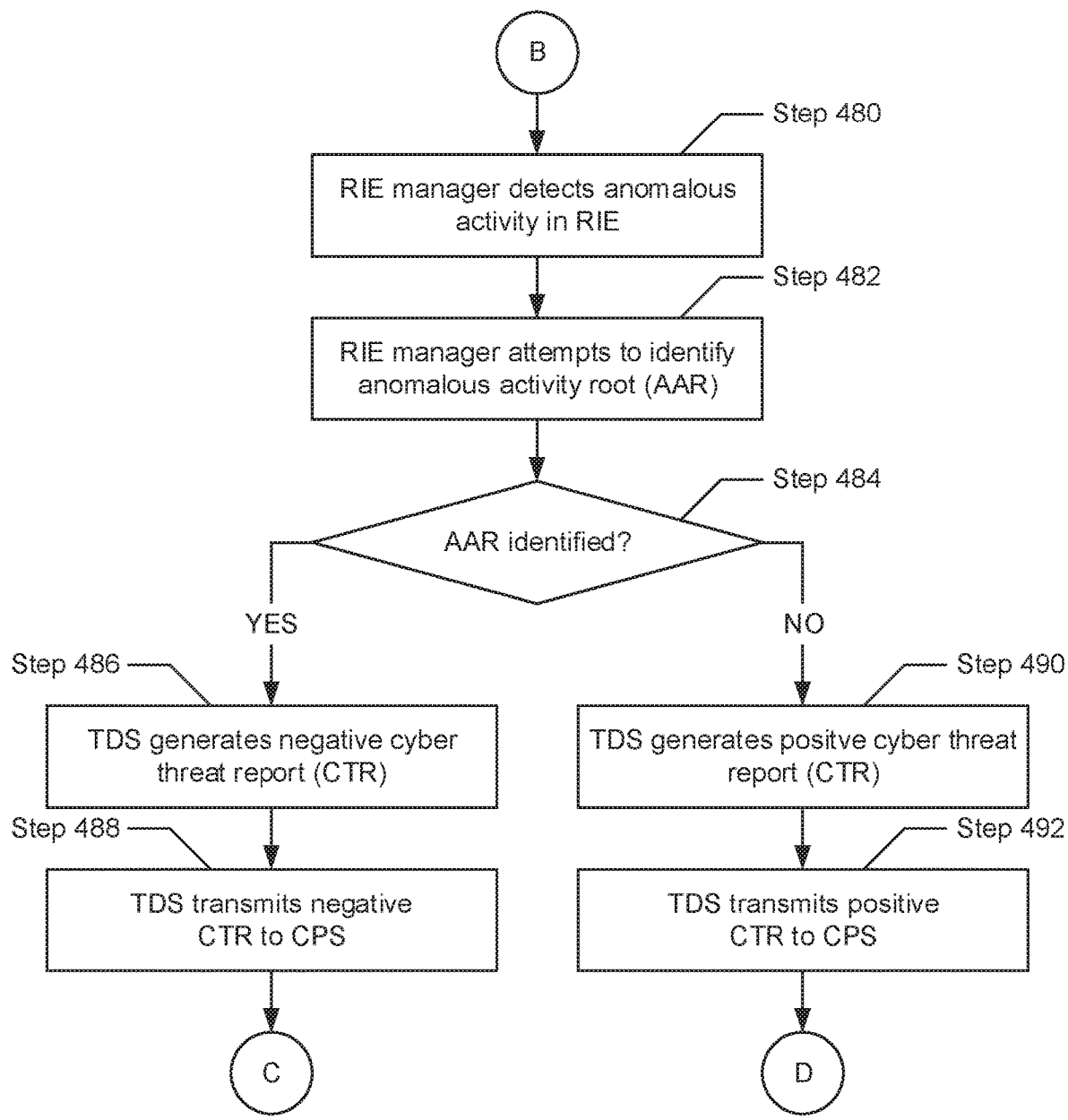

Turning to FIG. 4F, in Step 480, in another embodiment of the invention, following the monitoring/probing of the RIE (during Step 430; see e.g., FIG. 4B), anomalous activity (i.e., one or more anomalous events or trends) is detected. An anomalous activity within the AGI(s) may refer to a divergence in the expected behavior of one or more microservices, a containers, a computer processes, or any combination thereof, which implement at least a portion of the AGI(s). As mentioned above, anomalous activity may be an indicator for the presence of an unknown cyber security threat or attack executing within the AGI(s). Further, detection of the anomalous activity may entail tracking critical system and/or network characteristics exhibited by the AGI(s). Examples of the state of these critical characteristics that may lead to the detection of the anomalous activity may include, but are not limited to including: a network traffic volume exceeding a predefined threshold volume level, a network bandwidth use exceeding a predefined threshold bandwidth level, an execution of heavy cloud environment computing resources (e.g., high hard drive activity, high CPU load, high memory usage, etc.), a notable change in system behavior, a notable change in the execution of network calls, unauthorized attempts to use encryption, unauthorized attempts to change one or more settings in any OS registries, the unauthorized installation of new services, unauthorized changes to service configurations, and the unauthorized installation of new processes.

In Step 482, attempts are performed to identify an anomalous activity root (AAR). In one embodiment of the invention, the AAR may be a cause or instigator of the anomalous activity (detected in Step 480). The aforementioned cause or instigator may fall to one or more microservices, containers, and/or computer processes that implement at least a portion of the AGI(s). In one embodiment of the invention, an attempt at identifying the AAR may entail conducting any existing root cause analysis (RCAs) methodologies. In another embodiment of the invention, an attempt at identifying the AAR may entail activating malware detection tools to assess the anomalous activity. In yet another embodiment of the invention, an attempt at identifying the AAR may entail human intervention by way of the employment of a cyber security professional whom may run forensics on the anomalous activity. One of ordinary skill will appreciate that other existing procedures for attempting to identify the AAR may be used without departing from the scope of the invention.

In Step 484, a determination is made as to whether at least one AAR is identified. Substantively, if it is determined, based on the attempt(s) (performed in Step 482), that at least one AAR is identified, then the identifying may affirm that an unknown cyber security threat/attack may be responsible for the anomalous activity (detected in Step 480). Subsequently, based on this determination, the process proceeds to Step 486. On the other hand, if it is alternatively determined, based on the attempt(s) (performed in Step 482), that no/zero AARs were identified, then the lack of the identifying may affirm that an unknown cyber security threat/attack may not have been responsible for the anomalous activity (detected in Step 480). Subsequently, based on this determination, the process proceeds to Step 490.

In Step 486, after determining (in Step 484) that at least one AAR is identified, a negative cyber threat report (CTR) is generated. In one embodiment of the invention, the negative CTR may be a report detailing the negative outcome resulting from the probing of the AGI(s). Specifically, the negative CTR may include, but is not limited to including, the following information: (i) a recurring bit string or data pattern (i.e., a cyber threat/attack signature) affiliated with the identified AAR(s); (ii) states of one or more critical characteristics that served as indicators for the detection of the anomalous activity; (iii) the AGI(s) components (e.g., microservice(s), container(s), computer process(es), etc.) where the anomalous activity had been detected; and (iv) a recommendation to halt the proceeding of the CNA, with which the AGI(s) is/are associated, to the deployment stage of the ADP (see e.g., FIG. 1).

In Step 486, the negative CTR (generated in Step 486) is transmitted back to the CPS. In one embodiment of the invention, transmission of the negative CTR may represent a final task that follows the above-mentioned processing instructions specified in the TDS resource (for processing the AGI(s)). Further, transmission of the negative CTR may entail utilizing the webhook operatively connecting the CPS and the TDS. In one embodiment of the invention, in acting as a plugin, the webhook may not only facilitate the transmission of the webhook message (in Step 408) from the CPS to the TDS, but may also permit the return of information from the TDS back to the CPS in response or based on processing involving the webhook message and/or enclosed information (i.e., the AGI(s)) therein. From here, the process proceeds to Step 460A (see e.g., FIG. 4D).

In Step 490, after determining (in Step 484) that no/zero AARs had been identified, a positive cyber threat report (CTR) is generated. In one embodiment of the invention, the positive CTR may be a report detailing the positive outcome resulting from the probing of the AGI(s). Specifically, the positive CTR may include, but is not limited to including, a recommendation to permit the proceeding of the CNA, with which the AGI(s) is/are associated, to the deployment stage of the ADP (see e.g., FIG. 1).

In Step 492, the positive CTR (generated in Step 490) is transmitted back to the CPS. In one embodiment of the invention, transmission of the positive CTR may represent a final task that follows the above-mentioned processing instructions specified in the TDS resource (for processing the AGI(s)). Further, transmission of the positive CTR may entail utilizing the webhook operatively connecting the CPS and the TDS. In one embodiment of the invention, in acting as a plugin, the webhook may not only facilitate the transmission of the webhook message (in Step 408) from the CPS to the TDS, but may also permit the return of information from the TDS back to the CPS in response or based on processing involving the webhook message and/or enclosed information (i.e., the AGI(s)) therein. From here, the process proceeds to Step 460B (see e.g., FIG. 4E).

Figure 5:
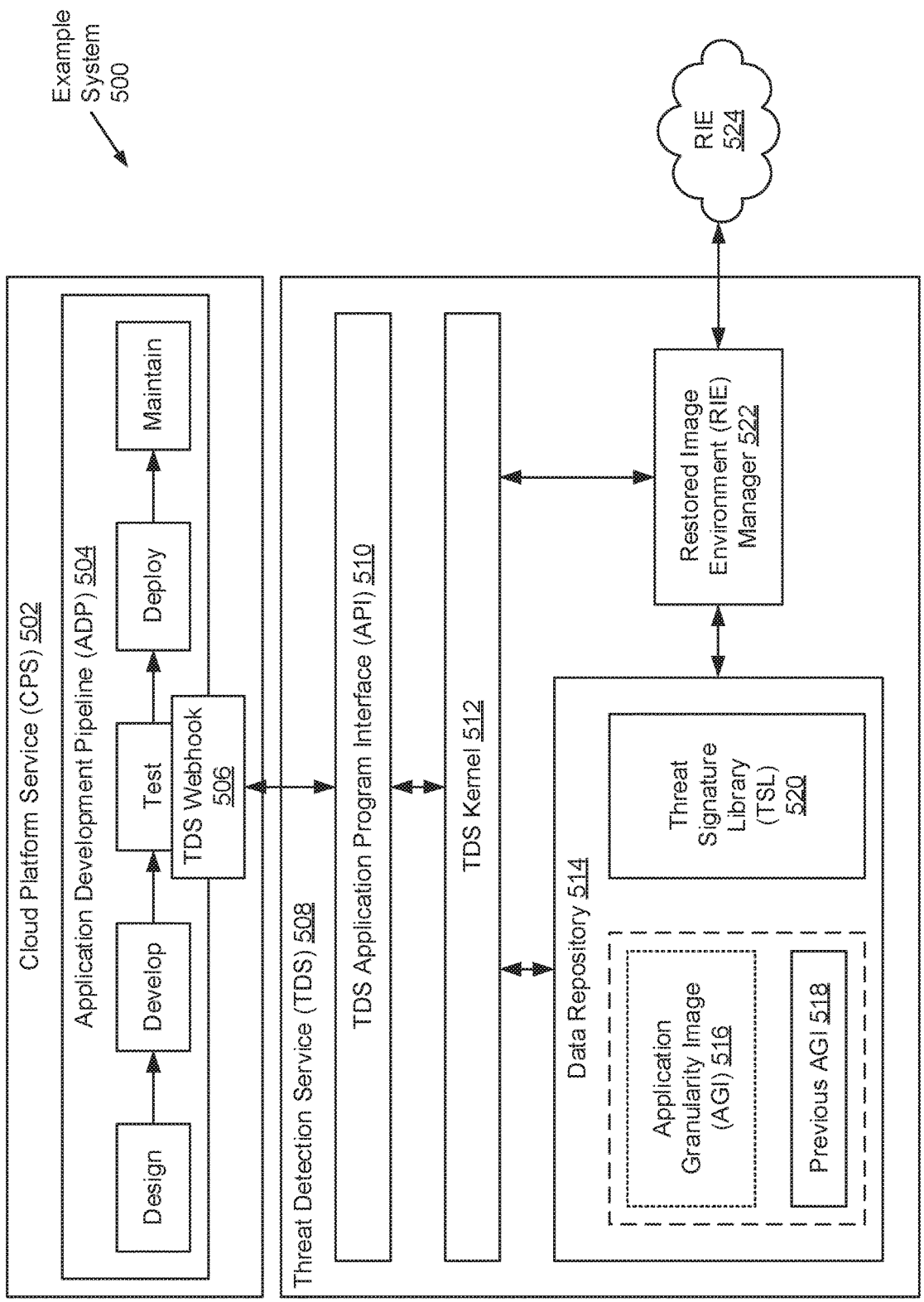
FIG. 5 shows an example system in accordance with one or more embodiments of the invention.

FIG. 5 shows an example system in accordance with one or more embodiments of the invention. The following example, presented in conjunction with components shown in FIG. 5, is for explanatory purposes only and not intended to limit the scope of the invention.

Turning to FIG. 5, the example system (500) includes a cloud platform service (CPS) (502) operatively connected to a threat detection service (TDS) (508). The CPS (502) is providing the tools and resources for implementing and managing an application development pipeline (ADP) (504), which include design, development, testing, deployment, and maintenance stages. Further, attached to the testing stage of the ADP (504) is a TDS webhook (506), which upon the triggering of an associated webhook trigger, forwards information specified during the configuration of the TDS webhook (506) (see e.g., FIG. 3) to the TDS (508) in real-time. Moreover, the TDS (508) includes a TDS application program interface (API) (510), a TDS kernel (512), and a data repository (514). The data repository (514) may store one or more application granularity images (AGIs) (516, 518) and a threat signature library (TSL) (520).

Turning to the example, consider a scenario whereby a cloud native application (CNA) (not shown), after undergoing the design and development stages of the ADP (504), arrives at the testing stage of the ADP. During the testing stage, as part of the evaluation of the CNA to determine whether the CNA meets the requirements that guided its design and development, the CPS (502) scans for modifications performed to the one or more container configuration and/or definition files included as part of the CNA. Based on the scanning, a modification to the Docker DockerFile associated with the CNA is discovered, which is interpreted as the CNA meeting the webhook trigger defined during the configuration of the TDS webhook (506).

In response to the webhook trigger being met, the CPS (502) generates an AGI (516) based on the CNA, and transmits the AGI (516) to the TDS (508) by way of a webhook message (not shown). The webhook message is subsequently received at a TDS resource (not shown) that includes coded instructions for parsing and/or processing the webhook message upon arrival. Per the aforementioned coded instructions, the webhook message is parsed to obtain the AGI (516) enclosed therein, and further, the AGI (516) is processed to perform a cyber security assessment of the CNA as part of the ADP.

Towards processing the AGI (516), the TDS kernel (512) first instantiates a restored image environment (RIE) (524) within a cloud computing environment. Thereafter, the TDS kernel (512) configures the RIE (524) by restoring the AGI (516) therein. Specifically, the TDS kernel (512) restores the AGI (516) by allocating cloud environment computing resources towards the instantiation of virtual machines (VMs) and/or containers that would emulate the one or more microservices implementing the AGI (516). After configuring the RIE (524), the TDS kernel (512) creates a RIE manager (522) responsible, at least in part, for executing the cyber security assessment. Creation of the RIE manager (522) may expend additional cloud environment computing resources.

Upon activation, the RIE manager (522) continuously probes the RIE (524), and the AGI (516) restored therein, using one or more data scanning algorithms. Based on the probing, the RIE manager (522) identifies a potential threat signature (PTS) (not shown) exhibited in the AGI (516). The RIE manager (522) subsequently compares the PTS against a set of known cyber security threat/attack signatures, associated with a set of known cyber security threats/attacks, stored in the TSL (520). Based on the comparing, the RIE manager (522) affiliates the identified PTS to a known cyber security threat/attack. Further, in response to the affiliation, the RIE manager (522) notifies the TDS kernel (512) of the negative outcome of the probing.

Based on the negative probing outcome reported by the RIE manager (522), the TDS kernel (512) generates a negative cyber threat report (CTR) (not shown). The negative CTR includes: (i) the identified PTS; (ii) a brief description describing the known cyber security threat/attack associated with the known cyber security threat/attack signature to which the identified PTS matches; (iii) the AGI (516) components (e.g., microservice(s), container(s), computer process(es), etc.) where the identified PTS was discovered; and (iv) a recommendation to halt the proceeding of the CNA to the deployment stage of the ADP (504). Through the plugin nature of the TDS webhook (506), the TDS (508) subsequently transmits the negative CTR back to the CPS (502). Finally, based on the recommendation included in the negative CTR, the CPS (502) prevents the proceeding of the CNA to the deployment stage of the ADP (504), thereby notifying the associated CNA developers accordingly.

Figure 6:
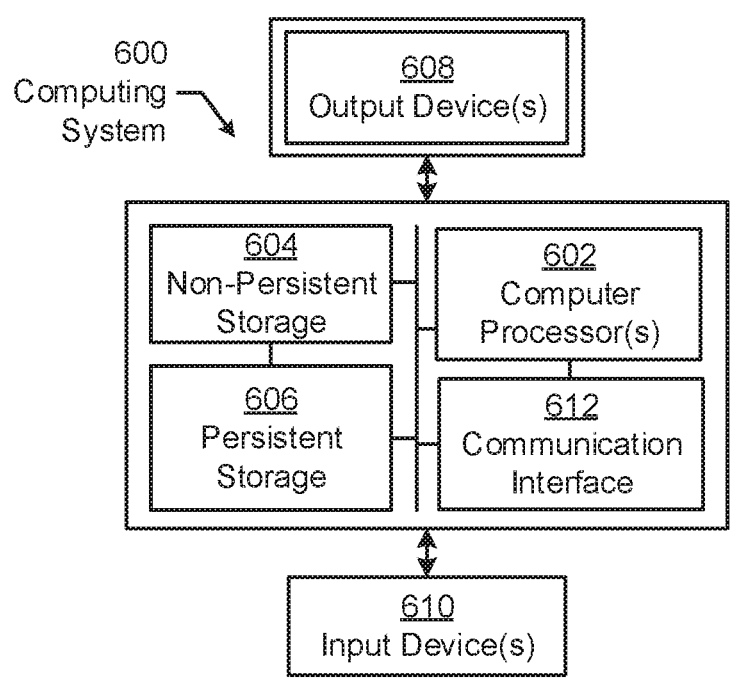
FIG. 6 shows a computing system in accordance with one or more embodiments of the invention.

FIG. 6 shows a computing system in accordance with one or more embodiments of the invention. The computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device. Further, the communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

In one embodiment of the invention, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Embodiments of the invention relate to a method and system for implementing CNA threat detection. CNAs are often built using stacks of different containers, which include third-party containers and open-source containers. Further, these third-party and/or open-source containers may rarely be examined in terms of performing cyber security assessments. One or more embodiments of the invention disclosed herein implements these assessments, thereby filtering which CNAs proceed towards deployment onto an application marketplace, or alternatively, onto production systems whereon the CNAs are eventually installed. Accordingly, the advantages one or more embodiments of the invention presents include: (i) exposing threats immediately after those threats are introduced, thereby enabling the identification and resolution of root causes more speedily; (ii) executing the cyber security assessments on the most up-to-date CNA versions, thereby ensuring the validity of the simulations; (iii) removing the responsibility of performing cyber security assessments from CNA developers, thereby granting CNA developers the flexibility to integrate new container stacks; and (iv) ensuring Ops that a CNA is safe to use in a production environment without having Ops manually verify each build.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for implementing cloud native application (CNA) threat detection, comprising:
   in response to a CNA meeting a webhook trigger:
   receiving a webhook message comprising an application granularity image (AGI);
   instantiating a restored image environment (RIE) within a cloud computing environment;
   configuring the RIE through a restoration of the AGI therein; and
   probing the AGI, within the RIE, to perform a cyber security assessment of the CNA as part of an application development pipeline (ADP),
   wherein the CNA meeting the webhook trigger comprises detecting a modification to a document configuring or defining a container stack implementing the CNA,
   wherein probing the AGI, within the RIE, to perform the cyber security assessment of the CNA, comprises:
   employing a data scanning algorithm to probe the AGI within the RIE;
   based on the employing, identifying a potential threat signature (PTS) in the AGI;
   determining that the PTS does not match a known cyber security threat signature; and
   based on the determining, generating a recommendation to permit a proceeding of the CNA to a deployment stage along the ADP.

2. The method of claim 1, wherein the webhook trigger corresponds to a webhook attached to a testing stage of the ADP.

3. The method of claim 1, wherein the document is one selected from a group consisting of a Docker DockerFile, a Kubernetes Pod Configuration File, a Kubernetes Deployment Descriptor File, and a CloudFoundry Manifest File.

4. The method of claim 1, wherein the AGI is an image-based snapshot of a CNA granularity, wherein the CNA granularity comprises one selected from a group consisting of a microservice portion, a complete microservice, and a set of collaborative microservices.

5. The method of claim 1, further comprising:
   determining that the PTS matches a known cyber security threat signature; and
   based on the determining, generating a recommendation to deny a proceeding of the CNA to a deployment stage along the ADP.

6. The method of claim 1, further comprising:
   detecting anomalous activity exhibited in the AGI using the data scanning algorithm;
   succeeding to identify an anomalous activity root (AAR) instigating the anomalous activity; and
   based on the succeeding, generating a recommendation to deny a proceeding of the CNA to a deployment stage along the ADP.

7. The method of claim 1, further comprising:
   detecting anomalous activity exhibited in the AGI using the scanning algorithm;
   failing to identify an anomalous activity root (AAR) instigating the anomalous activity; and
   based on the failing, generating a recommendation to permit a proceeding of the CNA to a deployment stage along the ADP.

8. A system, comprising:
   a cloud platform service (CPS) comprising a first computer processor programmed to implement an application development pipeline (ADP); and
   a threat detection service (TDS) kernel executing on a second computer processor operatively connected to the CPS,
   wherein the TDS kernel is programmed to:
   in response to a cloud native application (CNA) meeting a webhook trigger:
   obtain, for the CNA, an application granularity image (AGI) originating from the CPS;
   instantiate a restored image environment (RIE) within a cloud computing environment;
   configure the RIE through a restoration of the AGI therein; and
   create a RIE manager responsible for probing the AGI, within the RIE, to perform a cyber security assessment of the CNA as part of the ADP,
   wherein the CNA meeting the webhook trigger comprises detecting a modification to a document configuring or defining a container stack implementing the CNA,
   wherein probing the AGI, within the RIE, to perform the cyber security assessment of the CNA, comprises:
   employing a data scanning algorithm to probe the AGI within the RIE;

based on the employing, identifying a potential threat signature (PTS) in the AGI;

determining that the PTS does not match a known cyber security threat signature; and based on the determining, generating a recommendation to permit a proceeding of the CNA to a deployment stage along the ADP.

9. The system of claim 8, further comprising:

a data repository operatively connected to the TDS kernel, and configured to store at least the AGI and a threat signature library (CTL), wherein the CTL comprises a plurality of known cyber security threat signatures, wherein each known cyber security threat signature of the plurality of known cyber security threat signatures uniquely identifies a different known cyber security threat.

10. The system of claim 9, further comprising:

a TDS operatively connected to the CPS, and comprising:

the second computer processor, a TDS application program interface (API) executing on the second computer processor, the TDS kernel, the data repository, the RIE manager, and the RIE.

11. The system of claim 8, wherein the CPS comprises a webhook attached to a testing stage of the ADP, wherein the webhook is defined through the AGI, the webhook trigger, and a webhook destination uniform resource locator (URL) associated with a TDS resource residing on the TDS.

12. A non-transitory computer readable medium (CRM) comprising computer readable program code, which when executed by a computer processor, enables the computer processor to:

in response to a cloud native application (CNA) meeting a webhook trigger:

receive a webhook message comprising an application granularity image (AGI);

instantiate a restored image environment (RIE) within a cloud computing environment;

configure the RIE through a restoration of the AGI therein; and probe the AGI, within the RIE, to perform a cyber security assessment of the CNA as part of an application development pipeline (ADP), wherein the CNA meeting the webhook trigger comprises detecting a modification to a document configuring or defining a container stack implementing the CNA, wherein probing the AGI, within the RIE, to perform the cyber security assessment of the CNA, comprises:

employing a data scanning algorithm to probe the AGI within the RIE;

based on the employing, identifying a potential threat signature (PTS) in the AGI;

determining that the PTS does not match a known cyber security threat signature; and based on the determining, generating a recommendation to permit a proceeding of the CNA to a deployment stage along the ADP.

13. The non-transitory CRM of claim 12, wherein the webhook trigger corresponds to a webhook attached to a testing stage of the ADP.

14. The non-transitory CRM of claim 12, wherein the document is one selected from a group consisting of a Docker DockerFile, a Kubernetes Pod Configuration File, a Kubernetes Deployment Descriptor File, and a Cloud-Foundry Manifest File.

15. The non-transitory CRM of claim 12, wherein the AGI is an image-based snapshot of a CNA granularity, wherein the CNA granularity comprises one selected from a group consisting of a microservice portion, a complete microservice, and a set of collaborative microservices.

16. The non-transitory CRM of claim 12, wherein the computer readable program code further enables the computer processor to:

determine that the PTS matches a known cyber security threat signature; and based on the determining, generate a recommendation to deny a proceeding of the CNA to a deployment stage along the ADP.

17. The non-transitory CRM of claim 12, the computer readable program code further enables the computer processor to:

detect anomalous activity exhibited in the AGI using the data scanning algorithm;

succeed to identify an anomalous activity root (AAR) instigating the anomalous activity; and based on the succeeding, generate a recommendation to deny a proceeding of the CNA to a deployment stage along the ADP.

18. The non-transitory CRM of claim 12, wherein the computer readable program code further enables the computer processor to:

detect anomalous activity exhibited in the AGI using the scanning algorithm;

fail to identify an anomalous activity root (AAR) instigating the anomalous activity; and based on the failing, generate a recommendation to permit a proceeding of the CNA to a deployment stage along the ADP.

* * * * *